W. J. LLOYD.
FISHING APPLIANCE.
APPLICATION FILED DEC. 30, 1920.
1,410,817.
Patented Mar. 28, 1922.
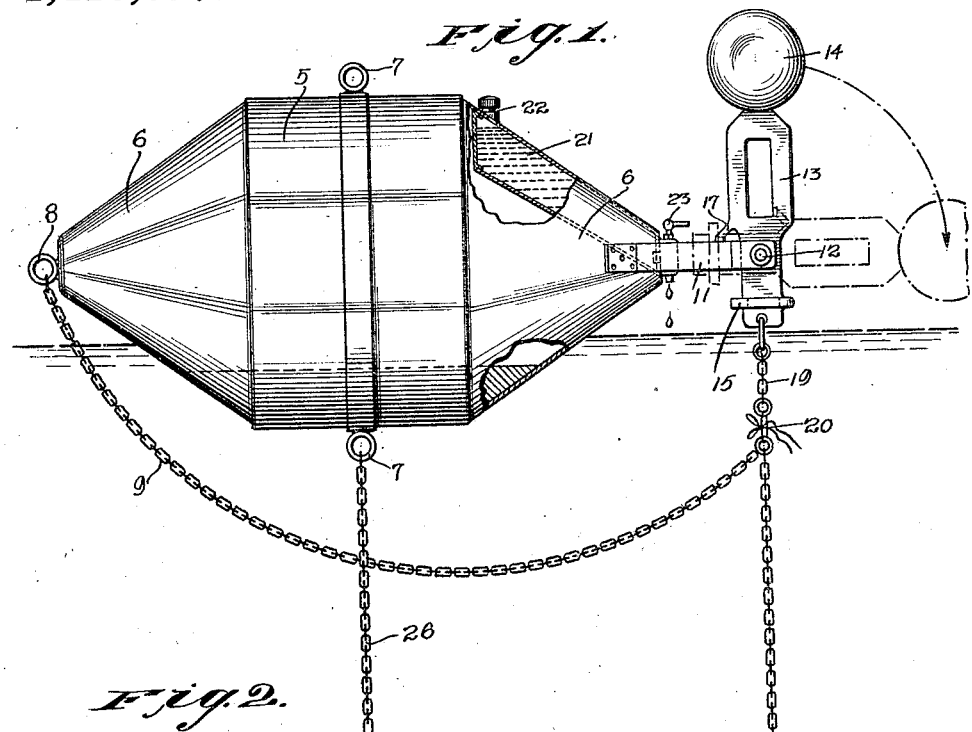
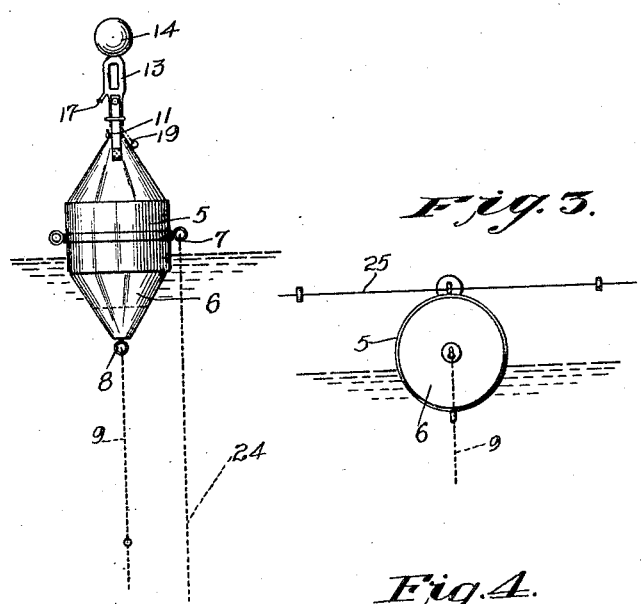
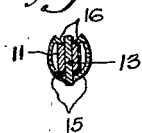
WITNESSES
INVENTOR
WALTER J. LLOYD
BY
ATTORNEYS

UNITED STATES PATENT OFFICE.

WALTER JOSEPH LLOYD, OF STUART, FLORIDA.

FISHING APPLIANCE.

1,410,817.

Specification of Letters Patent. Patented Mar. 28, 1922.

Application filed December 30, 1920. Serial No. 434,074.

*To all whom it may concern:*

Be it known that I, WALTER J. LLOYD, a citizen of the United States, and resident of Stuart, in the county of Palm Beach and State of Florida, have invented a new and improved Fishing Appliance, of which the following is a full, clear, and exact description.

My invention relates to a fishing appliance, and aims to provide a device of this character, more particularly adapted for use in connection with the catching of larger classes of sea and fresh water animals, such as sharks, sea lions, alligators, etc., but being primarily intended to be utilized in connection with the catching of sharks.

It is well appreciated in connection with the shark catching industry, that it has been quite customary to resort to two different methods, the first being that of utilizing a net, and the second where a hook and line are employed.

The first expedient has proven far from satisfactory, in that a net involved the expenditure of a considerable amount of money, and its meshes are readily severed due to the struggles of sharks within the net.

The second method also offers objections due to the fact that a greater amount of time and labor must be employed to produce efficient results aside from the fact that the individuals manipulating the line must be extremely strong, for the reason that a shark or similar animal, upon being caught, will exert a tremendous pulling force.

Having this in mind, I have constructed a fishing appliance, more particularly in the nature of a float, and which shall be capable of being utilized to advantage in the catching of all larger types of water animals.

A further object of my invention is the provision of a device of this character, which shall indicate to an observer, at a distant point, as to whether anything has been caught upon the hook, or other element associated with the fishing appliance.

A still further object of my invention is the provision of a fishing appliance, which shall be provided with indicating means serving to indicate as to whether the bait may have been removed from the catching element, or whether the same has not been disturbed.

Another object of my invention is the provision of a device of the type specified, which shall not alone effect the catching of sea animals, and fishes, but which shall also include means serving as an attraction to these animals so that they will be attracted to the catching medium through a relatively great distance.

Further objects of my invention will appear in the annexed specification and drawings which latter present one practical embodiment of my invention, and in which—

Figure 1 is a fragmentary partly sectional side elevation of a fishing appliance, constructed in accordance with my invention, and showing the parts of the same arranged in their normal position.

Figure 2 is a side elevation of the appliance and showing the position which the parts assume upon an animal having been caught.

Figure 3 illustrates the method of arranging a plurality of these appliances in a single group, and Figure 4 is an end view of one of the elements employed in connection with my fishing appliance.

In these views the reference numeral 5 indicates the body of a float which is provided with conical end portions 6, and has associated with it suitable securing means 7, in the nature of ring bolts, by means of which it may be retained in any desired locality, in a manner hereinafter more fully specified.

One of the end portions 6 of the float 5 may conveniently be provided with a securing element 8 to which the upper end of a chain or cable 9 may be attached, a hook or any suitable catching element 10, of any desired character being fixed to the opposite end of this member.

A bracket 11 is affixed to, and extends beyond the second end portion 6 of the float 5, and is pivotally secured as at 12, adjacent the outer end of this bracket is a signal member including a body 13, with which a ball 14 or other suitable visual indicating means may be associated, it being noted in this connection that this element more than counter-balances the inner end of the body 13 so that the same tends to fall over.

In this connection it is to be noted that any suitable type of locking device, such as prongs 15, forming a part of the inner end of the body 13, the shoulders 16 of the prongs 15 engaging with the bracket 11 to prevent a return of the body 13 to its normal position upon the same having once moved to the position indicated in dotted lines in Figure 1. Also the stop 17 may conveniently form a part of the body 13, to prevent the same from falling in a direction other than that indicated by the arrow in Figure 1, for a purpose hereinafter more fully specified.

Assuming that the bait 18 has been associated with the catching appliance 10, it will be seen that by providing a second chain or cable 19, having its upper end secured to the inner end of the body 13, its lower end being connected to the element 9 by a relatively fragile connection, such as a piece of fishing line 20, that the signal, including the ball 14 will assume the position shown in Figure 1, the float 5 assuming a horizontal position. In other words, the body 13 and ball 14 will be disposed at right angles to the longitudinal axis of the float.

It will thus be obvious, that upon the bait 18 having been removed from the hook, by small fishes of a size incapable of being caught by this element, and of a weight insufficient to cause a severance of the line 20, that the ball will counter balance the weight of the cable or chain 9, as well as the similar element 19, and will drop to the position indicated in dotted lines in Figure 1. Thus a remote observer is capable of noting that it will be necessary to bait the appliance again, as both the float and signal will be extending in a horizontal plane, a return of the latter being precluded by virtue of the interlocking engagement provided by the shoulders 16 of the prongs 15, and the bracket 11.

If, on the other hand, a shark or other sea animal has taken the hook 10 or catching implements utilized it will be seen that this will effect a severance of the fragile element 20, which will permit the ball 14 to drop downwardly, as has been indicated in dotted lines in Figure 1, in which position it will be retained by virtue of the structure aforespecified.

Subsequent, or simultaneous to this action, the float will move on end, due to the shifting of the pull of the weights associated therewith, and it will be perfectly obvious to the distant observer, reference being had to Figure 2, that an animal has been caught upon the hook 10.

Now with a view of providing means serving as an attraction to attract the animal or fish to be caught, it will be noted, reference being had to Figure 1, that I provide a tank 21 within the float 5, which tank may be provided with a filling opening 22, and a drip opening 23 at its lower end. This tank is adapted to receive blood or a similar substance serving as an attraction to the animals to be caught, and it will be obvious that this dripping action will permeate the water thereabouts, and to some distance therefrom, so that the shark or other animal will be caused to move to the proximity of the appliance, thus increasing the general efficiency of the latter.

Thus I have provided an appliance of the nature specified, which may either be anchored by means of a chain 24, or be arranged on what is commonly known as a trot line 25, as in Figure 3, in which latter instance, the trot line will pass through the upper ring bolt 7.

It will also be seen that my appliance will serve to provide indicating means, as for instance, when the float and ball are in the position illustrated in full lines in Figure 1, a distant observer may be assured that no animal has been caught by the appliance, and that the bait is properly in position thereon, where the ball is in the position illustrated in dotted lines in Figure 1, that the bait has been removed by some water animals, and where the parts are both extended in a vertical plane that the appliance must have attention as an animal or fish has been caught thereon.

Obviously a device of this type will avoid difficulties incident to the manual manipulation of a hook and line, as well as overcoming the objections with regards to the utilization of a conventional net.

Obviously numerous modifications of structure might readily be resorted to without in the least departing from the spirit of my invention, which I claim as;

1. A fishing appliance, including a float, a signal associated with said float, said signal being adapted to normally extend in a plane at right angles to the longitudinal axis of said float, a catching device supported by said float and adapted to co-operate with said signal, to cause the same to move into the same plane as that occupied by the float upon the bait being removed from said catching device.

2. A fishing appliance, including a float, a signal associated with said float, said signal being adapted to normally extend in a plane at right angles to the longitudinal axis of said float, a catching device supported by said float and adapted to co-operate with said signal, to cause the same to move into the same plane as that occupied by the float upon the bait being removed from said catching device, and further means for causing said float to occupy a substantially vertical plane upon an animal becoming attached to said catching device.

3. A fishing appliance including a float, a bracket attached to said float, a signal including a body pivotally attached to said bracket, means serving as an indicator attached to the outer end of said body, and serving as a counter weight tending to normally overbalance the same, a catching device attached to said float and normally suspended from the inner end of said body portion, the weight of said catching appliance upon being properly baited, being greater than the counter balancing tendency of the indicator associated with the outer end of said body portion.

4. A fishing appliance, including a float, a bracket attached to said float, a signal including a body pivotally attached to said bracket, means serving as an indicator attached to the outer end of said body, and serving as a counter weight tending to normally overbalance the same, a catching device attached to said float and normally suspended from the inner end of said body portion, the weight of said catching appliance upon being properly baited being greater than the counter balancing tendency of the indicator associated with the outer end of said body portion, and means preventing a movement on the part of said body portion with respect to the said bracket other than in a predetermined direction.

5. A fishing appliance, including a float, a bracket attached to said float, a signal including a body pivotally attached to said bracket, means serving as an indicator attached to the outer end of said body and serving as a counter weight tending to normally overbalance the same, a catching device attached to said float and normally suspended from the inner end of said body portion, the weight of said catching appliance upon being properly baited being greater than the counter balancing tendency of the indicator associated with the outer end of said body portion, and locking means attached to the inner end of said body and being adapted to co-operate with said bracket for preventing a return of said body portion to its normal position after the same has been permitted to move to a position dictated by the counter balancing tendency of said indicator, upon the pull exerted by said catching appliance having been relieved from the inner end of said body.

6. A fishing appliance, including a float, a signal including a body pivotally attached to said float, means attached to the outer end of said body and tending to over balance the same, a catching appliance and attaching medium serving to secure the same to said float, and a cord adapted to be broken and serving to normally suspend said catching appliance from the inner end of said body portion.

7. A fishing appliance, including a float, a signal including a body pivotally attached to said float, means attached to the outer end of said body and tending to over balance the same, a catching appliance and attaching medium serving to secure the same to said float, and a further attaching medium presenting a portion adapted to be broken, said latter attaching medium serving to normally suspend said catching device from said float.

WALTER JOSEPH LLOYD.